UNITED STATES PATENT OFFICE.

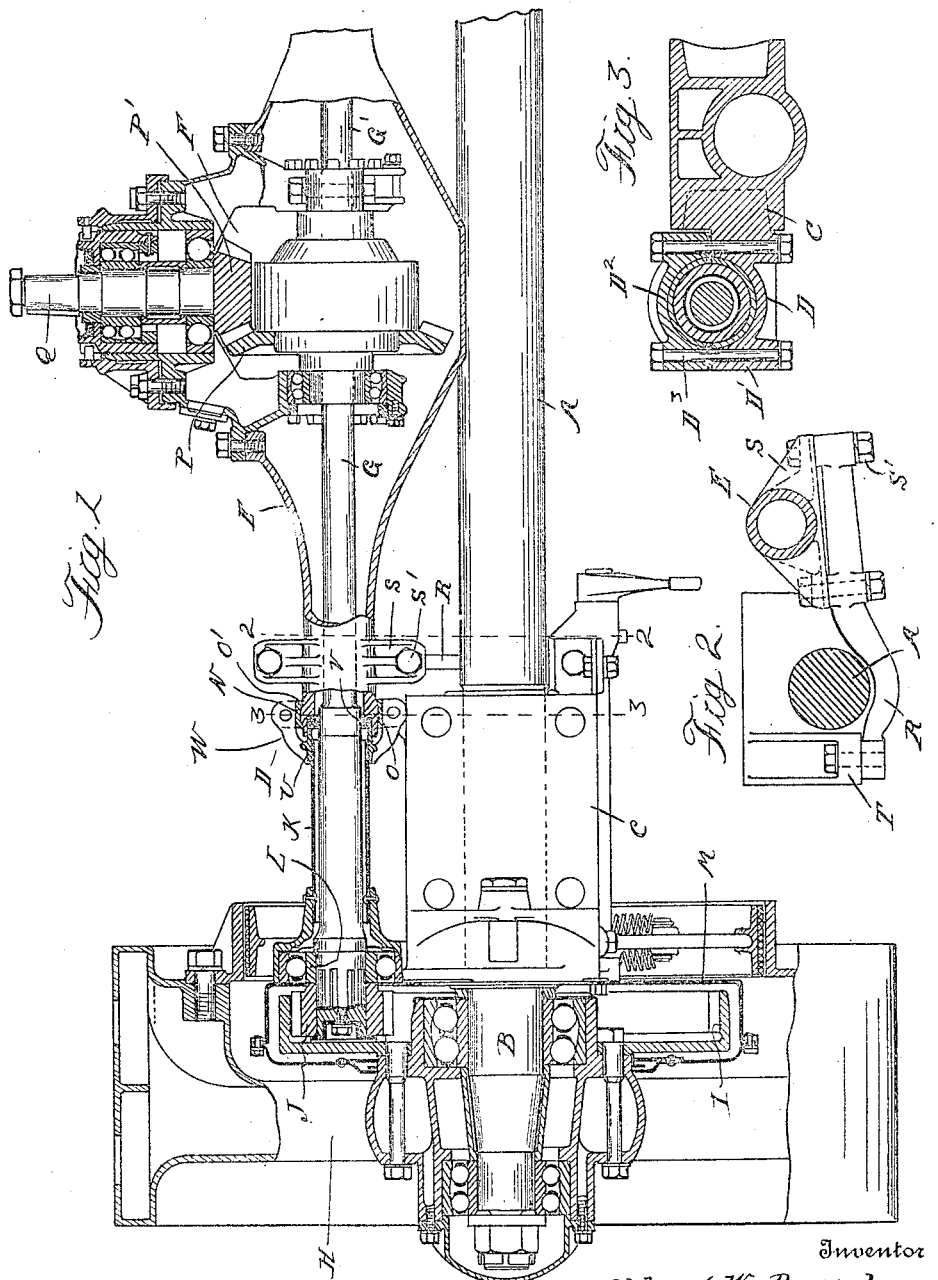

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

VEHICLE AXLE.

1,421,836.

Specification of Letters Patent. Patented July 4, 1922.

Application filed May 29, 1919. Serial No. 300,673.

*To all whom it may concern:*

Be it known that I, ALBERT W. RUSSEL, a citizen of the United States of America, residing at Detroit, in the county of Wayne and State of Michigan, have invented certain new and useful Improvements in Vehicle Axles, of which the following is a specification, reference being had therein to the accompanying drawings.

The invention relates to vehicle axles of that type comprising a dead or load-sustaining axle portion having wheel bearings at its opposite ends together with a housing arranged parallel to the dead axle and supported thereby, containing the driving shafts and differential gearing. More specifically, the invention has reference to constructions in which the housing for the differential gearing and driving shafts is provided with a section insertable between the springs which are mounted upon the dead axle. The present invention consists in various features of construction, such as the means for mounting the detachable housing section, means for taking care of the torque, and various other features as hereinafter set forth.

In the drawings:

Figure 1 is a sectional plan view of the axle;

Figure 2 is a cross-section on line 2—2 of Figure 1;

Figure 3 is a cross-section on line 3—3 of Figure 1.

A is the dead axle which, as shown, is a round shaft terminating at its opposite ends in wheel bearing spindles B. C are spring supports mounted on the axle A inside of the spindle portions B, and D are laterally extending arms for supporting the housing E containing the differential gearing F and drive shafts G and G'. H are the wheels mounted upon the spindles B; I are internal gear wheels mounted on the wheels H, and J are pinions in mesh with said internal gear wheels and mounted on the shafts G and G'.

To permit of removal of the housing E, it is limited in length so as to be insertable between the vehicle springs upon the spring supports C. There are, however, auxiliary housing members K which extend from the ends of the removable housing E to points adjacent to the internal gear wheel. At the outer ends of these auxiliary housings are the supporting bearings L for the shafts G and G', said bearings being mounted upon heads M secured to the spring supports C. The shafts G and G' are inserted through the outer ends of the auxiliary housings K when the wheels H are removed, and pass inward into the aligned ends of the housing E and into engagement with the differential gearing F. Thus, to disconnect the housing E it is only necessary to remove the shafts G and G' and then withdraw said housing from its supporting bearings, which are between the vehicle springs.

The housing E is not designed to carry the load upon the axle and as there will be more or less deflection in the dead axle A when under load, it is desirable to so connect the housing as to relieve the same from stress. I, therefore, preferably form spherical bearings N at the opposite ends of the housing E which engage spherical sockets O in the arms D. These sockets are not, however, integral with the arms D but are formed in bushings or liners which have cylindrical outer surfaces O' longitudinally slidably engaging corresponding semi-cylindrical bearings D' in the members D. The semi-cylindrical cap members D² are then clamped upon the bushings by bolts D³ and serve to hold the same from displacement. This arrangement has the advantage that the spherical bearings will permit of universal adjustment to compensate for stresses, while the cylindrical bushings permit of longitudinal adjustment in original assembly and avoid the necessity of exact relative location of the spherical bearings.

While the casing E does not carry the load upon the axle, it is subjected to torque stresses, due to the re-action of the beveled gears P and P' which communicate motion to the shafts G and G' from the propeller shaft Q. To take care of this torque are provided one or more torque arms R, preferably at each end of the housing E and connected thereto by being bolted, or otherwise secured, to laterally projecting lugs S integral with the housing. As shown, the lugs S extend on opposite sides of the housing and are attached to the arms R by bolts S', while the free end of the arm passes beneath the dead axle A and is bolted to a lug T on the inner side of the spring support C.

It is important to form a dust and oil proof connection between the adjacent ends of the housing E and auxiliary housings K and without interfering with freedom for removing the housing E. For this purpose there is provided a sleeve U slidable upon the auxiliary housing K and telescopically engaging the end portion of the housing E, preferably with a packing gasket V for forming a tight joint. When the housing E is mounted or dismounted, the sleeve U is slid back upon the housing K so as not to interfere, but after the housing E is in place the sleeve is moved into telescopic engagement therewith and is secured preferably by arms W passing between the half-bearing D' and the cap $D^2$. These arms are perforated for the bolts $D^3$ and when the latter are in place, will be locked from disengagement.

With the construction as described, in use, the load upon the axle will not stress the jack-shaft housing E for the reason that the universal joints formed by the spherical bearing members at the opposite ends of said housing will permit automatic adjustment to compensate for deflections. On the other hand, the torque stresses are carried through the housing E to the opposite ends thereof and through the torque arms R to the anchoring bearings T. Whenever it is desired to remove the jack-shaft housing E, shafts G and G' are drawn outward after which the caps $D^2$ may be removed and the housing lifted off from the bearings D.

What I claim as my invention is:

1. In a vehicle axle, the combination with a dead or load-carrying axle member, of spring supports mounted thereon, a jack-shaft housing extending between said spring supports, and universal bearings for said housing on said spring supports.

2. In a vehicle axle, the combination with a dead or load-carrying axle, of spring supports mounted thereon, a jack-shaft housing extending parallel to said dead axle between said spring supports, a universal pivotal bearing for said jack-shaft housing on said spring support, and a torque arm projecting from said housing and anchored to said dead axle.

3. In a vehicle axle, the combination with a dead or load-carrying axle, provided with wheel bearing spindles at its opposite ends, of spring supports mounted on said axle adjacent to said spindles, a jack-shaft arranged parallel to said dead axle, housing members for the end portions of said jack-shaft mounted on said spring supports, a housing member extending between said end housing members, universal pivotal bearings for the ends of the latter housing member, and a torque arm extending from said housing member and anchored to said dead axle.

4. In a vehicle axle, the combination with a dead or load-carrying axle provided with wheel bearing spindles at its opposite ends, of spring supports mounted on said axle adjacent to said spindles, bearing members extending laterally from said spring supports, a jack-shaft housing member extending between the bearings of the opposite spring supports and pivotally supported thereon, an auxiliary housing member in alignment with said first-mentioned housing, a shaft extending through the aligned housings, and a member sleeved on said auxiliary housing movable into engagement with said first-mentioned housing to form a dust proof and oil-proof seal therewith.

5. In a vehicle axle, the combination with a dead or load-carrying axle, of a spring support mounted thereon, a jack-shaft housing parallel to said dead axle having a section fixed in relation to said spring support, and an aligned section mounted upon said spring support, and a member sleeved upon one of said sections slidable into engagement with the other section to form a sealing joint therebetween.

6. In a vehicle axle, the combination with a dead or load-carrying axle, of an arm projecting laterally from said dead axle, a cylindrical bearing in said arm, a jack-shaft housing having a spherical bearing thereon and a bushing having a spherical face engaging said spherical bearing, and a cylindrical face engaging said cylindrical bearing.

7. In a vehicle axle, the combination with a dead axle, of a jack-shaft housing parallel thereto, an arm projecting laterally from said dead axle, a bearing in said arm for supporting said jack-shaft housing, and a bushing intermediate said bearing and said housing having a spherical engagement with one and a longitudinal adjustment with the other.

8. In a vehicle axle, the combination with a dead axle, of a jack-shaft housing arranged parallel thereto, an arm projecting laterally from said dead axle forming a supporting segmental bearing for said jack-shaft housing, a cap for said bearing clamped thereto, and a bushing clamped within said bearing by said cap having a spherical engagement with said housing.

9. In a vehicle axle, the combination with a dead axle, of a jack-shaft housing arranged parallel thereto, an arm projecting laterally from said dead axle forming a segmental supporting bearing for said housing, a complementary segmental cap for said bearing, a bushing having a spherical engagement with said housing clamped in said bearing by said cap, an auxiliary housing in alignment with and spaced from said first-mentioned housing, a sleeve upon said auxiliary housing longitudinally adjustable thereon into sealing engagement with said first-mentioned housing, and a lug on said sleeve extending between said cap and bearing and clamped thereby.

10. In a vehicle axle, the combination with a dead axle, of a spring support mounted thereon, a jack-shaft housing parallel to said dead axle and having a section fixedly mounted on said spring support, and a removable section in alignment therewith, an arm projecting laterally from said spring support forming a segmental supporting bearing for the detachable section of said housing, a complementary segmental cap for said bearing, a bushing having a spherical engagement with the detachable section of said housing and clamped in said bearing, a sleeve on said fixed housing section adjustable thereon into engagement with said detachable housing member, and a lug on said sleeve extending between said bearing and cap and clamped thereby.

11. In a vehicle axle, the combination with a dead axle, of a jack-shaft housing arranged parallel thereto and provided with a section fixedly secured to said dead axle, and an aligned section removably supported thereon, a torque arm projecting from said removable section to the opposite side of said dead axle, and a fixed anchor bearing on said dead axle for the end of said torque arm.

12. In a vehicle axle, the combination with a dead axle and spring supports thereon, of a jack-shaft housing arranged parallel to said dead axle and provided with a section fixedly secured thereto, and an aligned section removably supported on said dead axle between said spring supports, a torque arm projecting from said removable section to the opposite side of said dead axle and an anchor bearing on the inner end of one of said spring supports for the end of said torque arm.

In testimony whereof I affix my signature.

ALBERT W. RUSSEL.